United States Patent [19]  
Boelkins

[11] 3,820,827  
[45] June 28, 1974

[54] QUICK DISCONNECT COUPLING FOR COAXIAL FLUID LINES
[75] Inventor: Wallace G. Boelkins, Grand Rapids, Mich.
[73] Assignee: Uni-Mist, Inc., Grand Rapids, Mich.
[22] Filed: Feb. 2, 1972
[21] Appl. No.: 222,890

[52] U.S. Cl. .......................... 285/133 R, 285/316
[51] Int. Cl. ............................................. F16l 47/00
[58] Field of Search........ 285/133 R, 138, 316, 315, 285/137 R, 134, 136

[56] References Cited
FOREIGN PATENTS OR APPLICATIONS
484,768  5/1938  Great Britain..................... 285/315

Primary Examiner—Dave W. Arola
Attorney, Agent, or Firm—Price, Heneveld, Huizenga & Cooper

[57] ABSTRACT

A co-axial quick disconnect coupling for coaxial fluid lines including an external plug-and-socket combination having an internal plug and socket mounted coaxially therein. Preferably, the internal plug member is mounted within the external socket portion of the connector while the internal socket is mounted within the external plug portion. Valves incorporated in the internal plug and socket prevent flow of the fluid in the coaxial line when the assembly is disconnected.

8 Claims, 7 Drawing Figures

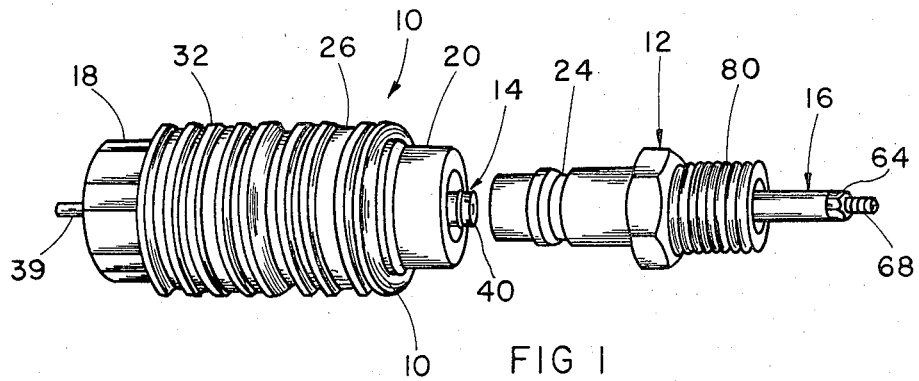
FIG 1
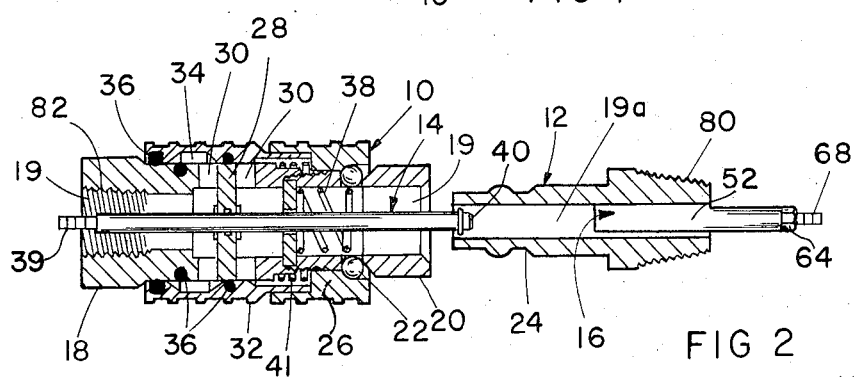
FIG 2
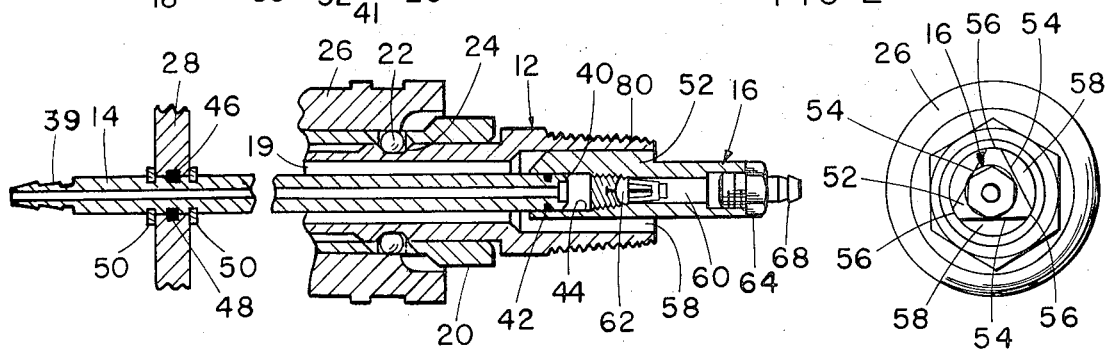
FIG 3
FIG 4
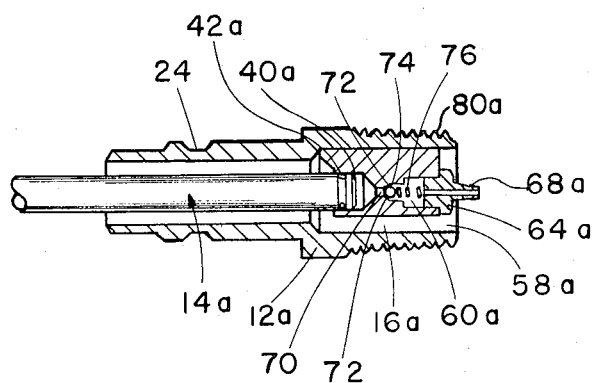
FIG 5

QUICK DISCONNECT COUPLING FOR COAXIAL FLUID LINES

BACKGROUND OF THE INVENTION

Coaxial fluid lines have long been used in industry to deliver various fluids from a source to a point of utilization. Oil and air, for example, are quite commonly delivered in coaxial lines to power and lubricate air-driven tools, motors and the like. Such systems generally include coaxial fluid transmission lines connected from the tool to a manifold block an injection lubricator or the like, where the oil and air is introduced from separate sources. The lines are generally provided with threaded connector ends which are threadably received on the tool and the manifold block. Replacement of the tool or disconnection from the manifold block requires that at least one of the threaded ends be removed by the use of a wrench or the like. In other applications coaxial tubing is utilized to deliver various fluids to a nozzle or the like where it is mixed or misted for lubrication of cutting tools or similar applications. In either event it is very desirable to have a coupling, and particularly a "quick-disconnect" coupling, for connecting and disconnecting the coaxial supply lines as a unit such that the tool, nozzle, or other item to which the individual fluids are delivered in the coaxial tubing may be readily removed or connected; however, whereas quick-disconnect couplings have long been in use for single fluid tubes, no suitable such device has heretofore been available for coaxial pairs of tubes or lines.

SUMMARY OF THE INVENTION

The present invention, therefore, provides a coupling for coaxial fluid lines wherein connection and/or disconnection of a pair of coaxial lines may be readily and instantly accomplished. The connector of the present invention comprises a first connector structure having an external or outer plug-and-socket portion adapted for mutual connection in series within a first fluid supply line. Such plug and socket are fitted together and locked in place by means of a conventional socket-locking mechanism. A second, internal coaxial connecting structure is centrally located within the first connecting structure and, in a preferred embodiment, includes an interior plug member mounted within the first or outer socket and an interior socket member mounted within the first or outer plug. Each plug and socket is in general coaxial alignment with the supporting components. Either or both of the coaxially mounted first and second connecting structures may include check valves to prevent flow of the fluids when disconnected. The inner or second plug extends coaxially within the first socket and may be mounted for slight radial or skewing movement to assist and aid in the automatic alignment of the various component parts as they are connected. Also, the arrangement of parts is such that when the coupling is connected together, the inner plug and socket connect together and seal against leakage before fluid can flow through the outer plug and socket, a feature which can be very important, especially in the lubrication of air tools.

Accordingly, it is a primary object of the present invention to provide a coupling member for coaxial fluid lines.

It is another object of the invention to provide a quick disconnect coupling member for coaxial fluid lines.

It is another object of the invention to provide a coaxial connector unit adapted for use with coaxial fluid lines.

It is yet another object of the present invention to provide a coaxial connector having valve means therein to automatically block the flow of fluids as the connector portions are disconnected.

These and other important objects, advantages, and features of the present invention will become more apparent upon reading the following specification and with references to the accompanying drawings.

BRIEF DESCRIPTION OF THE DRAWINGS

The invention will now be described with reference to the accompanying drawings in which:

FIG. 1 is a perspective view of a coupling member incorporating the present invention;

FIG. 2 is a cross-sectional view of the coupling member shown in FIG. 1;

FIG. 3 is an enlarged, fragmentary cross-sectional view similar to FIG. 2 illustrating the inner plug-and-socket in an engaged position, with parts of the outer connector eliminated for clarity;

FIG. 4 is an end view of the plug shown in FIG. 3;

FIG. 5 is a cross-sectional view similar to FIG. 3 but illustrating an alternate check valve arrangement utilized in the plug portion of the coaxial connector;

DESCRIPTION OF THE PREFERRED EMBODIMENT

Figure 6:
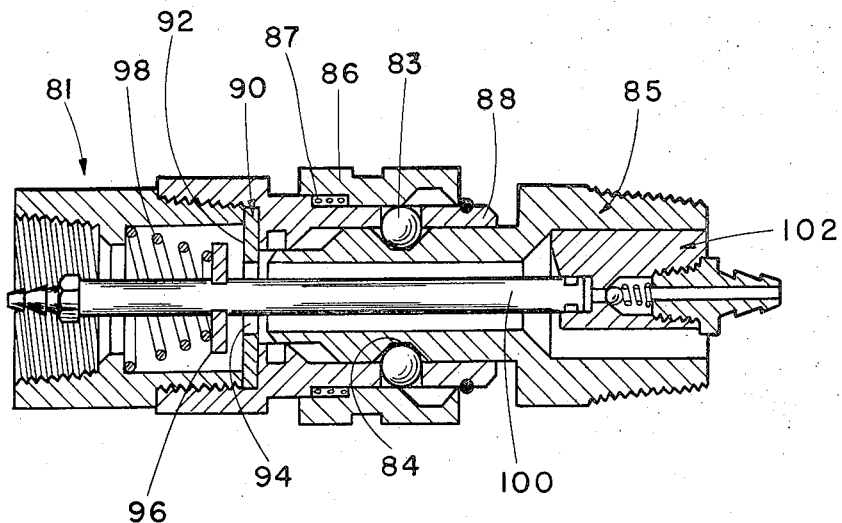
FIG. 6 is a cross-sectional view similar to FIG. 2 illustrating an alternate coupling member incorporating the present invention.

Referring now to the drawings and in particular to FIGS. 1 and 2, the connector or coupling of the invention will be described in detail. Basically, the invention includes a connector assembly having a first or outer socket portion 10 and a first ot outer plug portion 12. Positioned coaxially within such first socket-and-plug portions is a second or inner plug 14 and a second or inner socket 16. Preferably, the second or inner plug is disposed within the first or outer socket, and the second socket within the first plug. The first or outer plug-and-socket combination are basically of conventional construction, and include an elongated valve body 18 (FIG. 2) into which a socket receiver body 20 is threadably fastened. A plurality of locking balls 22 are spaced in recesses formed about the outer diameter of the socket receiver body 20 for cooperative locking engagement within a peripheral groove or recess 24 formed in the outer plug portion 12. A sleeve 26 is slidably mounted along the length of the body 18 to move the balls 22 inwardly and into locking engagement with the outer plug 12.

To allow the flow of a first fluid through the outer plug and socket portions of the coupling, both the valve body 18 and the receiver 20 have a continuous communicating passageway 19 and 19a formed along their length (FIG. 2). A barrier member or wall 28 is formed in the passageway 19 of the body 18 and a plurality of orifices 30 are provided on either side of the barrier.

The orifices 30 extend radially outwardly on both sides of the barrier. A sleeve valve 32 having a circumferential groove 34 formed in its inner diameter is slidably mounted on the valve body. The sleeve valve 32 is shiftably between open and closed positions with respect to the orifices 30 to control the flow of fluid through the body. As illustrated in FIG. 2, the valve is in a closed position. When open, the sleeve is shifted toward the right such that the orifices 30 communicate with each other through the passageway formed by radial groove 34, which then spans the barrier 28. A plurality of "O" rings 36 are suitably placed in grooves or slots about both the outer diameter of the body 18 and the inner diameter of the valve sleeve 32 to prevent leakage of the fluid from about the valve sleeve and body. Sleeve bias spring 41 is provided to bias sleeve 26 along the valve body and socket into a locked position when the plug 12 is inserted into the socket reveiver body 20. Coil spring 38 biases plug 12 outwardly when the sleeve 26 is moved to an unlocked position for ease of removal.

As will be known by those skilled in the art, that which has been thus far described, with the exception of the briefly mentioned second or inner plug and socket 14 and 16, is of conventional construction and readily commercially available. One type of such quick-disconnect coupling which is readily adaptable to the practice of the present invention is available from the Hanson Manufacturing Company, of Cleveland, Ohio.

Operation of the basic connector described above is accomplished in a conventional manner, that is, the release of the plug 12 from the socket 10 is impossible until the sliding sleeve valve 32 is moved to the left (as shown in FIG. 2) to thereby move the passageway formed by radial groove 34 into a non-communicating position with respect to the orifices 30 on either side of the barrier 28. This shuts off the flow of fluid through the coupling. Downstream fluid under pressure exhausts axially along the sides of the coupling, reducing the pressure in the forward section to zero. The locking mechanism sleeve 26 can then be moved axially (to the left) along the length of the body to the position shown in FIG. 2, to release the locking balls 22 and thereby allow the plug to be withdrawn.

The present invention resides in the provision of, and the adaption of a conventional connector plug and socket as above described into, a quick disconnect coaxial coupling arrangement for connecting coaxial fluid lines. Coaxial fluid lines generally include a first outer line into which a second, smaller diameter, line is coaxially arranged such that two separate fluids may be transported in the space of a single line.

The second or inner coaxial cooperating plug 14 and second or inner socket 16 provided in accordance with this invention are best illustrated in FIGS. 3 and 4, wherein detail portions of the previously described conventional outer connector have been omitted for clarity. The inner plug 14 is basically an elongated, rigid, hollow metal tube preferably formed from seamless steel tubing. One end 39 of the tube may be provided with a tapered and circumferentially ridged engaging portion for insertion into the inner coaxial fluid line. The opposite or leading end of the plug 14 is provided with a rounded end portion 40. A circumferential groove is provided in the outer diameter a slight distance back from the leading end portion 40, into which an "O" ring 42 is positioned for sealing engagement with an inner diameter 44 of the second or inner socket 16, which is fixed centrally of the first or outer plug 12.

The inner plug 14 is fixed within the wall or barrier 28 and extends coaxially with the passageway 19. The plug 14 is sealed with respect to the wall 28 by means of an "O" ring 46 positioned in a circumferential groove 48 in the plug 14. Snap rings 50 positioned in corresponding grooves in the plug 14 on opposite sides of the wall 28 hold the plug and prevent its axial movement. A limited amount of radial or pivotal travel is allowed, however, to assist in alignment with the inner socket 16 when the connector is coupled. Plug 14 is free to rotate with respect to outer socket 10 to prevent wind-up of tubing attached to the plug 14 during installation.

The second or inner socket 16 has a housing 52 with an axial bore along its length. The housing 52 is machined to have a plurality of flat areas 54 (FIG. 4) along the sides thereof, at least along those portions disposed within the plug 12. More particularly, in its preferred form, the outer configuration of such portions of the housing 52 is basically triangular in shape, having rounded corner portions 56 which correspond to the inner diameter of the passage 19a within outer plug 12. The rounded corners 56 fit within the inner diameter of the first plug 12, where the socket member 16 is secured, as by welding, brazing, or the like. The spaces between the flat triangular side portions 54 and the inner diameter of the plug 12 then form a plurality of passageways 58 (FIGS. 3 and 4) for the flow of the first fluid through the outer plug.

An axial bore 60 (FIG. 3) through the length of the second or inner socket 16 forms the passageway for a second fluid. The axial bore 60 includes the enlarged inner diameter entrance portion 44 which receives the rounded end 40 of the inner plug 14. The bore 60 also has a threaded portion in which a spring-loaded check valve 62 is positioned. This valve may be of conventional construction as, for example, a tire valve core, and includes a spring-loaded plunger and a seat to allow the flow of fluid under pressure in a first direction, i.e., from the inner plug 14 through and out of the inner socket 16, and through the axial bore provided through the various parts. The outlet end of the inner socket 16 may be provided with a nipple 64 threadably received in the end of the bore 60. A washer (not specifically shown) may be positioned between the hexagonal head flange on the nipple which abuts the end of the socket, to prevent leakage of the fluid passing therethrough. An extended end of the nipple may be provided with rib-like projections 68 for engagement within continuing inner coaxial fluid line (not shown).

A modified valve construction for the inner coaxial socket is illustrated in FIG. 5. In this embodiment, like reference numerals bearing the suffix letter "a" are utilized to describe like parts. The inner plug 14a is provided with the rounded end portion 40a and an "O" ring 42a is positioned in a groove about the outer diameter of the plug. The inner socket 16a is constructed similar to that described previously and is fixed within the inner diameter of the outer plug 12a as by welding or the like to form a plurality of first fluid passageways 58a. The bore 60a, however, includes an area of reduced diameter 70 tapering outwardly toward the exit end of the socket to form a valve seat 72. A ball valve 74 which may be constructed of nylon or similar material is adapted to seat on valve seat 72 and is biased into closed position by a bias spring 76. The spring 76 is held in position within the bore 60a and against ball 74 by the nipple 64a threadably received in the bore 60a in the same manner as previously described. The amount of pressure required to displace the ball 74 from the seat 72 may be varied by changing the characteristics of the bias spring 76.

Referring again to FIGS. 1 through 4, in use the coaxial fluid lines which are to be attached are connected to opposite ends of the connector, at the threaded portion 80 on the outer plug assembly 12 and at the ribbed portion 68 of nipple on the inner socket 16 and at the opposite end of the connector at the internally threaded portion 82 on the outer socket 10 and the ribbed end extremity 39 on the inner plug 14. To connect the two main components of the coupling together, the outer plug 12 and inner socket 16 are pressed into the outer socket 10 and inner plug 14, such that the locking balls 22 are ultimately biased into position within the groove 24 in the outer plug 12. It should be noted, however, that the forward rounded end 40 of the inner plug 14 is of such a length relative to the other parts of the coupling that this end is inserted into the inner-diameter bore opening 44 of the inner socket, in sealed relation, prior to the locking of the balls 22 within the groove 24, and thus prior to the movement of sleeve valve 32 into position allowing flow through the outer passage. This insures that there will be no leakage of fluid from the inner passage prior to time flow is established or allowed through the outer passage. This can be quite important where, for example, air tools are lubricated through the inner passage and driven through the outer passage. When both passages are thus connected, in the manner just described, two separate coaxial passageways are formed through the length of the connector to allow simultaneous, but independent, passage of two separate fluids.

In one practical application of the invention the inner passage formed through the second plug 14 and second socket 16 is utilized for the transmission of oil or other liquid coolant or lubricant. The outer passage formed through the bore of the body 18 through the ports 30 and in the passageways 58 formed between the second socket and first plug is utilized for the transmission of compressed air. The pressure at which the oil is transmitted is sufficient to overcome the bias of the check valve (62 as in FIG. 3, or 74 as in FIG. 5) to allow the passage of the fluid through the bore. Disconnection of the two coaxial line sections is readily accomplished in the same manner as for a conventional single-passage coupling, i.e., by sliding the sleeve valve 32, and then the locking sleeve 26, to the left as viewed in FIG. 3, and removing the outer plug 12 from the outer socket 10. Simultaneously, the inner plug 14 and inner socket 16 are disconnected from each other. The check valve 62 (FIG. 3) or 74 (FIG. 5) then seats, to prevent the flow of the fluid from the inner line.

A modified embodiment of the invention is illustrated in FIG. 6, wherein a slightly different basic stage of quick disconnect socket member is utilized, but which like the previous such member has also been used heretofore in single-tube lines. In this embodiment, the socket member 81 is basically similar to that previously described, but includes a centrally located valve 90 for the outer socket to stop the flow of a first fluid when the coupling is disconnected. The remaining details of the construction of the mechanisms for engaging the outer plug are essentially the same to that previously described and include a plurality of locking balls 83 spaced in recesses formed about the diameter of the socket body 88 for cooperative locking engagement with a peripheral groove 84 formed in the outer plug portion 85. A locking sleeve 86 is slidably mounted along a portion of the body and is biased forwardly (i.e., toward the plug 85) by coil spring 87, to move the balls 82 inwardly and into locking engagement with the groove 84 in the outer plug structure 85, in the position illustrated in FIG. 6.

The valve 90 includes two basic operating components, a seating surface 92 having a central opening 94 therein, and a valve closure member 96. The closure member 96 is normally biased into engagement with the seat 92 by bias spring 98 to close the central opening 94. An inner plug 100 having essentially the same configuration as the inner plug member 14 described in connection with FIGS. 1 – 5 is fixed centrally within and for movement with the valve closure member 96, against the force of bias spring 98. An inner socket member 102 positioned within the outer plug 85 is also similar to that previously described and illustrated in FIGS. 1 through 4, or 5.

As the outer plug 85 and the inner socket 102 are placed into engagement with the outer socket 80 and the inner plug 100, the inner plug 100 is moved axially by the inner socket along the length of the assembly overcoming the bias spring 98. This shifts the valve closure member 96 away from the valve seat 92 and allows passage of the first fluid through the opening 94. The second fluid passageway through the inner plug and socket is the same as that previously described, and it is to be observed that in this embodiment, like the one described previously, the forward end of the inner plug engages and seals within the inner socket before valve closure member 96 is pushed away from seat 92, to insure that there will be no leakage from the inner passage before the connection of the outer passage is established.

Figure 7:
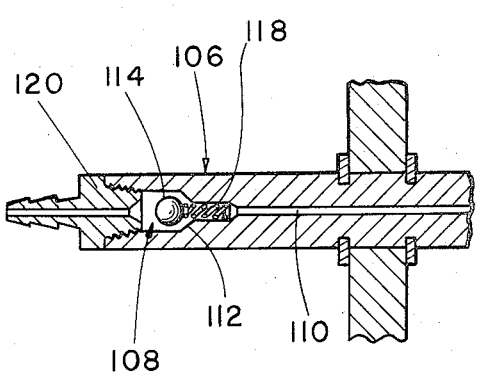
FIG. 7 is a cross-sectional view illustrating a modified inner-plug arrangement having a check valve therein for use with Venturi-type lubricators.

It will be recognized that various check valve arrangements and placements may be utilized within the inner plug or socket portion of the invention to control the fluid flow through the center passage in either direction. In one application of the invention for use with lubricators and like devices of the kind known as "Venturi type," in which there is positive pressure at the inlet or upstream end of the inner plug, the check valve associated with the inner plug and socket may be positioned at the inlet end of the inner plug structure. Such a construction is illustrated in detail in FIG. 7. In this embodiment, an inner plug member 106 is mounted in a manner similar to that previously described in connection with FIGS. 1 through 6. In this embodiment, however, a differential check valve assembly 108 is provided at the inlet end of the inner plug member 106. An axial bore 110 through the plug is enlarged near the entrance opening to form a conical or like valve seat 112. A ball valve 114 is positioned with an enlarged diameter entrance opening adjacent the valve seat 112 and, when there is some pressure in the bore 110 between the coupling and the lubricator (as is normally the case) the ball valve 114 is biased out of seating engagement by the combined effect of the pressure just noted plus the force from a bias spring 118 positioned between the seat and the reduced diameter bore 110. This is the condition shown in FIG. 7. The ball and socket are retained within the end of the plug by a nipple 120 threadably received in the end of the plug. In operation with a lubricator, or device of the type referred to, when pressures upstream and downstream from the ball valve are within a predetermined range of near equality, the flow through passageway 110 is continuous since spring 118 will maintain ball 114 off seat 112. When downstream pressure drops sufficiently to allow upstream pressure to overcome the bias spring force, as when the coupling is disconnected, the ball seals off the opening until the downstream pressure plus the spring force is approximately the same as the upstream spring force, whereupon fluid flow is again allowed.

Conversely, with a lubricator of the kind known as "positive displacement type", in which the upstream portion of the inner line is filled with fluid (but not under pressure), the check valve may take a form such as is shown in FIGS. 3, 4 or 6, wherein the valve seats to prevent flow through the center passage of the coupling when there is no reduced pressure or fluid displacement from the downstream end of the inner socket, e.g., on nipple 64 or 64a, i.e., when the coupling is disconnected.

The present invention will therefore be seen to provide a simple, easily-fabricated coupling member for simultaneous "quick-disconnect" connection of each of a pair of coaxial fluid lines. While the coupling is relatively simple in construction, it is nonetheless very efficient in its operation. The assembly, as hereinabove described, may be accomplished by a relatively simple modification of standard forms of single-line connectors or it may be a complete assembly onto itself, specifically designed for a coaxial fluid application. While it is not strictly necessary, for example, to incorporate a check valve within the plug and socket portions exactly in the same manner as specifically described, it is contemplated that within the scope of this invention, the check valves differential pressure valves and the like may be incorporated in either of the plugs or sockets to prevent fluid flow when disconnected. In addition, the inner plug and socket may be coaxially mounted within the outer plug and socket, respectively, rather than in the coaxial plug to socket and socket to plug relationship illustrated.

While a preferred and several alternate embodiments of the invention have been illustrated and described, it will be recognized by those skilled in the art that other embodiments and modifications of the invention incorporating the teachings hereof may be readily made in the light of this disclosure. All modifications embodying the principles of this invention are therefore considered as included in the appended claims unless these claims by their language expressly state otherwise.

The embodiments of the invention in which an exclusive property or privilege is claimed are defined as follows:

1. A connector for connecting the ends of coaxial-type fluid lines comprising: a first plug and a first socket member cooperatively engageable to form a first fluid passageway; a second plug and a second socket member cooperatively engageable to form a second fluid passageway; and means mounting said second plug and socket members at least partially inside said first plug and socket members to thereby provide a pair of mutually distinct and separate fluid passageways one within the other, said means mounting at least one of said second plug and socket members for skewing movements within said first plug and socket members such that the members so mounted may be shifted into positions of axial disposition which are at least slightly angularly disposed with respect to the axis of the other members; and means for holding said plugs and socket members together in their said cooperative engagement with one another.

2. The connector as defined in claim 1 and including means for releasably connecting said first plug and socket together.

3. The connector as defined in claim 1 wherein said second socket is mounted in said first plug and said second plug is mounted in said first socket.

4. A connector for connecting the ends of coaxial-type fluid lines comprising: a first plug and a first socket member cooperatively engageable to form a first fluid passageway; a second plug and a second socket member cooperatively engageable to form a second fluid passageway; and means mounting said second plug and socket members at least partially inside said first plug and socket members to thereby provide a pair of mutually distinct and separate fluid passageways one within the other, said means mounting at least one of said second plug and socket members for continuous rotational movement relative to both said first plug and socket members; and means for holding said plugs and their respective socket members together in their said cooperative engagement with one another.

5. The connector as defined in claim 4, wherein said second plug member is rotational with respect to at least one of said first plug and said first socket.

6. The connector as defined in claim 5, wherein said second plug member is rotational with respect to said first socket.

7. The connector as defined in claim 5, wherein said second plug member is rotational with respect to said second socket member.

8. The connector as defined in claim 4, wherein said means mounting said one of said second plug and socket members further mounts the same for skewing movements within said first plug and socket members such that the former may be shifted into positions of axial disposition which are angularly disposed with respect to the axis of the latter.

* * * * *